(12) United States Patent
Maimone et al.

(10) Patent No.: US 10,845,761 B2
(45) Date of Patent: Nov. 24, 2020

(54) REDUCED BANDWIDTH HOLOGRAPHIC NEAR-EYE DISPLAY

(71) Applicant: Microsoft Technology Licensing, LLC, Redmond, WA (US)

(72) Inventors: Andrew Maimone, Duvall, WA (US); Andreas Georgiou, Cambridge (GB); Joel Steven Kollin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 15/453,174

(22) Filed: Mar. 8, 2017

(65) Prior Publication Data
US 2018/0188687 A1 Jul. 5, 2018

Related U.S. Application Data

(63) Continuation of application No. 15/397,646, filed on Jan. 3, 2017.

(51) Int. Cl.
*G03H 1/22* (2006.01)
*G03H 1/08* (2006.01)
(Continued)

(52) U.S. Cl.
CPC ......... *G03H 1/2294* (2013.01); *G02B 27/017* (2013.01); *G02B 27/0172* (2013.01);
(Continued)

(58) Field of Classification Search
CPC ...... G03H 1/0891; G03H 1/16; G03H 1/0808; G03H 1/26; G03H 1/2286; G03H 2210/62;
(Continued)

(56) References Cited

U.S. PATENT DOCUMENTS

| 4,012,119 A | 3/1977 | Adams et al. |
| 4,826,300 A | 5/1989 | Efron et al. |

(Continued)

FOREIGN PATENT DOCUMENTS

| DE | 102012100201 A1 | 9/2012 |
| EP | 2447787 A1 | 5/2012 |

(Continued)

OTHER PUBLICATIONS

"Stacked Flat Type Light Guide Panel" Tech Briefs Website, Available Online at http://www.techbriefs.com/component/content/article/14337, May 1, 2011, 4 pages.

(Continued)

*Primary Examiner* — Jade R Chwasz
(74) *Attorney, Agent, or Firm* — Alleman Hall Creasman & Tuttle LLP

(57) ABSTRACT

Examples are disclosed that relate to holographic near-eye display systems. One example provides a near-eye display device, comprising a diverging light source, an image producing dynamic digital hologram panel configured to receive light from the diverging light source and form an image. The near-eye display device also includes and a combiner comprising a holographic optical element positioned to receive light from the dynamic digital hologram panel and to redirect the light toward an eyebox, the holographic optical element being positioned between the eyebox and a view of an external environment to combine a view of the image formed by the dynamic digital hologram panel and the view of the external environment.

20 Claims, 3 Drawing Sheets

(51) Int. Cl.
*G02B 27/01* (2006.01)
*G03H 1/04* (2006.01)
*G02B 27/00* (2006.01)
*G02B 5/32* (2006.01)
*G03H 1/26* (2006.01)

(52) U.S. Cl.
CPC ......... *G03H 1/0486* (2013.01); *G03H 1/0808* (2013.01); *G03H 1/0866* (2013.01); *G03H 1/0891* (2013.01); *G03H 1/2205* (2013.01); *G02B 5/32* (2013.01); *G02B 27/0093* (2013.01); *G02B 2027/011* (2013.01); *G02B 2027/014* (2013.01); *G02B 2027/0174* (2013.01); *G02B 2027/0178* (2013.01); *G03H 1/2286* (2013.01); *G03H 2001/0491* (2013.01); *G03H 2001/0883* (2013.01); *G03H 2001/2284* (2013.01); *G03H 2001/264* (2013.01); *G03H 2210/44* (2013.01); *G03H 2222/52* (2013.01); *G03H 2223/23* (2013.01); *G03H 2225/55* (2013.01); *G03H 2226/02* (2013.01)

(58) Field of Classification Search
CPC .. G03H 2222/52; G02B 27/0081; G02B 5/32; G02B 27/0093; G02B 27/0075; G02B 2027/0174; G02B 2027/0178; G02B 2027/0138; G02B 2027/011; G02B 2027/014; G02B 27/0172; G02B 27/017; G02B 27/0101; G02B 2027/0141; G02B 27/179; G02B 26/0808; G02B 27/01; G02B 27/0103
USPC ............ 359/9, 11, 15, 19, 21, 22, 32, 34, 35
See application file for complete search history.

(56) References Cited

U.S. PATENT DOCUMENTS

| | | |
|---|---|---|
| 5,198,653 A | 3/1993 | Shen et al. |
| 5,331,446 A | 7/1994 | Hirai et al. |
| 5,715,337 A | 2/1998 | Spitzer et al. |
| 5,815,222 A | 9/1998 | Matsuda et al. |
| 5,907,416 A | 5/1999 | Hegg et al. |
| 6,043,910 A | 3/2000 | Slinger |
| 6,075,512 A | 6/2000 | Patel et al. |
| 6,404,538 B1 | 6/2002 | Chen et al. |
| 6,480,307 B1 | 11/2002 | Yang |
| 6,512,560 B2 | 1/2003 | Ohtake et al. |
| 6,512,566 B1 | 1/2003 | Yamagishi et al. |
| 6,690,447 B1 | 2/2004 | Stephenson et al. |
| 6,760,135 B1 | 7/2004 | Payne et al. |
| 7,068,910 B2 | 6/2006 | Duine et al. |
| 7,253,799 B2 | 8/2007 | Lee et al. |
| 7,845,841 B2 | 12/2010 | Sampsell |
| 7,876,405 B2 | 1/2011 | Ito et al. |
| 7,976,208 B2 | 7/2011 | Travis |
| 8,218,211 B2 | 7/2012 | Kroll et al. |
| 8,233,204 B1 | 7/2012 | Robbins et al. |
| 8,477,425 B2 | 7/2013 | Border et al. |
| 8,487,980 B2 | 7/2013 | Kroll et al. |
| 8,547,615 B2 | 10/2013 | Leister |
| 8,553,302 B2 | 10/2013 | Leister |
| 8,625,183 B2 | 1/2014 | Khan |
| 8,698,705 B2 | 4/2014 | Burke |
| 8,810,913 B2 | 8/2014 | Simmonds et al. |
| 9,122,244 B2 | 9/2015 | Lee et al. |
| 9,179,841 B2 | 11/2015 | Kim |
| 9,232,172 B2 | 1/2016 | Perkins et al. |
| 9,256,007 B2 | 2/2016 | Vasylyev |
| 9,335,604 B2 | 5/2016 | Popovich et al. |
| 9,341,846 B2 | 5/2016 | Popovich et al. |
| 9,406,166 B2 | 8/2016 | Futterer |
| 9,766,456 B2 * | 9/2017 | Christmas ............ G03H 1/0808 |
| 2003/0067760 A1 | 4/2003 | Jagt et al. |
| 2004/0108971 A1 | 6/2004 | Waldern et al. |
| 2004/0227703 A1 | 11/2004 | Lamvik et al. |
| 2005/0243258 A1 | 11/2005 | Oh |
| 2006/0028400 A1 | 2/2006 | Lapstun et al. |
| 2007/0019264 A1 | 1/2007 | Tanijiri et al. |
| 2008/0049450 A1 | 2/2008 | Sampsell |
| 2008/0212153 A1 | 9/2008 | Haussler et al. |
| 2009/0091811 A1* | 4/2009 | Asundi ................... G02B 21/36 359/15 |
| 2009/0244415 A1 | 10/2009 | Ide |
| 2010/0027289 A1 | 2/2010 | Aiki et al. |
| 2010/0053771 A1 | 3/2010 | Travis et al. |
| 2010/0056274 A1 | 3/2010 | Uusitalo et al. |
| 2010/0073744 A1 | 3/2010 | Zschau et al. |
| 2010/0103485 A1 | 4/2010 | Haussler |
| 2010/0149073 A1 | 6/2010 | Chaum et al. |
| 2010/0157399 A1 | 6/2010 | Kroll et al. |
| 2010/0186818 A1 | 7/2010 | Okorogu et al. |
| 2012/0013988 A1 | 1/2012 | Hutchin |
| 2012/0062850 A1 | 3/2012 | Travis |
| 2012/0105310 A1 | 5/2012 | Sverdrup et al. |
| 2012/0105765 A1 | 5/2012 | Kawai et al. |
| 2012/0120467 A1 | 5/2012 | Gruhlke et al. |
| 2012/0188791 A1 | 7/2012 | Voloschenko et al. |
| 2013/0022222 A1 | 1/2013 | Zschau et al. |
| 2013/0050186 A1 | 2/2013 | Large et al. |
| 2013/0051730 A1 | 2/2013 | Travers et al. |
| 2013/0100511 A1* | 4/2013 | Yamamoto ........... G02B 27/017 359/9 |
| 2013/0181888 A1 | 7/2013 | Kuriya et al. |
| 2013/0201094 A1 | 8/2013 | Travis et al. |
| 2013/0202297 A1 | 8/2013 | Martinelli et al. |
| 2013/0222348 A1 | 8/2013 | Jeong et al. |
| 2013/0222384 A1* | 8/2013 | Futterer ................. G02B 5/32 345/426 |
| 2013/0329301 A1 | 12/2013 | Travis |
| 2014/0033052 A1 | 1/2014 | Kaufman et al. |
| 2014/0063054 A1 | 3/2014 | Osterhout et al. |
| 2014/0104618 A1 | 4/2014 | Potsaid et al. |
| 2014/0104664 A1 | 4/2014 | Lee et al. |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0168735 A1 | 6/2014 | Yuan et al. |
| 2015/0016777 A1 | 1/2015 | Abovitz et al. |
| 2015/0036199 A1 | 2/2015 | Leister et al. |
| 2015/0085331 A1 | 3/2015 | Chae |
| 2015/0098066 A1 | 4/2015 | Jurbergs |
| 2015/0235448 A1* | 8/2015 | Schowengerdt ....... G06T 19/006 345/633 |
| 2015/0277123 A1 | 10/2015 | Chaum et al. |
| 2015/0277375 A1 | 10/2015 | Large et al. |
| 2015/0378080 A1* | 12/2015 | Georgiou ................ G02B 5/32 349/62 |
| 2016/0041393 A1 | 2/2016 | Inagaki |
| 2016/0077338 A1 | 3/2016 | Robbins et al. |
| 2016/0077339 A1 | 3/2016 | Christmas et al. |
| 2016/0139402 A1 | 5/2016 | Lapstun |
| 2016/0170372 A1 | 6/2016 | Smithwick |
| 2016/0195720 A1 | 7/2016 | Travis et al. |
| 2016/0238845 A1 | 8/2016 | Alexander et al. |
| 2016/0327796 A1 | 11/2016 | Bailey et al. |
| 2016/0379606 A1 | 12/2016 | Kollin et al. |
| 2017/0078652 A1 | 3/2017 | Hua et al. |

FOREIGN PATENT DOCUMENTS

| | | |
|---|---|---|
| GB | 2260203 A | 4/1993 |
| GB | 2461294 A | 12/2009 |
| GB | 2501754 A | 11/2013 |
| WO | 9735223 A1 | 9/1997 |
| WO | 9821612 A1 | 5/1998 |
| WO | 0172037 A1 | 9/2001 |
| WO | 03013151 A2 | 2/2003 |
| WO | 2008046057 A2 | 4/2008 |
| WO | 2008049917 A1 | 5/2008 |
| WO | 2008155563 A1 | 12/2008 |

(56) References Cited

FOREIGN PATENT DOCUMENTS

| WO | 2012088478 A1 | 6/2012 |
|---|---|---|
| WO | 2012103559 A1 | 8/2012 |
| WO | 2013028687 A2 | 2/2013 |
| WO | 2014085734 A1 | 6/2014 |
| WO | 2014151877 A1 | 9/2014 |
| WO | 2014167290 A1 | 10/2014 |
| WO | 2015032828 A1 | 3/2015 |
| WO | 2016105285 A1 | 6/2016 |

OTHER PUBLICATIONS

Serati, S. et al., "Advances in liquid crystal based devices for wavefront control and beamsteering", In Proceedings of Optics and Phototonics 2005, Aug. 18, 2005, San Diego, CA, USA, 14 pages.
"100% Fill Factor White Paper", Boulder Nonlinear Systems, Inc., Available Online at http://www.auniontech.com/uploadfile/2014/01/100%20Fill%20Factor%20White%20Paper.pdf, Jan. 2008, 2 Pages.
Zschau, E. et al., "Generation, encoding and presentation of content on holographic displays in real time", Three-Dimensional Imaging, Visualization, and Display 2010, vol. 7690. Apr. 2010, 14 pages.
Reichelt, S. et al., "Holographic 3-D Displays—Electro-holography within the Grasp of Commercialization", Advances in Lasers and Electro Optics, Apr. 2010, 29 pages.
Yaras, F. et al., "State of the Art in Holographic Displays: A Survey", Journal of Display Technology, vol. 6, No. 10, Oct. 2010, 12 pages.
Nahar, N. et al., "Efficient Free-Space Coupling to LMA-PCF by Aberration Correction", IEEE Transactions on Components, Packaging, and Manufacturing Technology, Oct. 2011, 6 pages.
Mirza, K. et al., "Key Challenges to Affordable See Through Wearable Displays: The Missing Link for Mobile AR Mass Deployment" Optinvent Website, Retrieved Online at http://www.optinvent.com/HUD-HMD-benchmark, Available as Early as Jun. 13, 2013, 8 pages.
"Spatial Light Modulators—XY Series", Boulder Nonlinear Systems, Inc., Retrieved Online at http://bnonlinear.com/pdf/XYseriesDS0909.pdf, Available as Early as Jul. 20, 2014, 12 pages.
Zhang, Z. et al., "Fundamentals of phase-only liquid crystal on silicon (LCOS) devices", Light: Science & Applications (2014) 3, Oct. 24, 2014, 10 pages.
Travis, A. et al., U.S. Appl. No. 14/589,513, "Virtual Image Display with Curved Light Path", filed Jan. 5, 2015, 32 pages.
Yeom, H. et al., "Design of holographic Head Mounted Display using Holographic Optical Element", Lasers and Electro-Optics Pacific Rim (CLEO-PR), vol. 3, Aug. 24, 2015, 10 pages.
Willekens, O. et al., "Paper No. S1.3: Lead Zirconate Titanate-Based Transmissive Liquid Crystal Lens Approach", SID Symposium Digest of Technical Papers, vol. 46, Iss. S1, Sep. 22, 2015, 1 page.
ISA European Patent Office, International Search Report and Written Opinion Issued in PCT Application No. PCT/US2015/068208, dated May 17, 2016, WIPO, 13 pages.
Pascotta, R., "Volume Bragg Gratings" Encyclopedia of Laser Physics and Technology, vol. 1, Jul. 31, 2016, 3 pages.
ISA European Patent Office, International Search Report and Written Opinion Issued in PCT Application No. PCT/US2016/039142, dated Dec. 9, 2016, WIPO, 17 pages.
IPEA European Patent Office, Second Written Opinion Issued in PCT Application No. PCT/US2015/068208, dated Dec. 14, 2016, WIPO, 4 pages.
IPEA European Patent Office, International Preliminary Report on Patentability Issued in PCT Application No. PCT/US2015/068208, dated Mar. 22, 2017, WIPO, 7 pages.
IPEA European Patent Office, Second Written Opinion Issued in PCT Application No. PCT/US2016/039142, dated Mar. 31, 2017, WIPO, 7 pages.
Travis, A., "Holographic Display" U.S. Appl. No. 14/921,864, filed Oct. 23, 2015, 38 pages.

Guenter, B. et al., "Foveated 3D Graphics", ACM Transactions on Graphics (TOG) 31, No. 6, Nov. 20, 2012, 10 pages.
ISA European Patent Office, International Search Report and Written Opinion Issued in PCT Application No. PCT/US2017/019231, dated May 26, 2017, WIPO, 14 pages.
ISA European Patent Office, International Search Report and Written Opinion Issued in PCT Application No. PCT/US2015/021922, dated Jun. 2, 2015, WIPO, 10 pages.
Huebschman, M. et al., "Dynamic holographic 3-D image projection", Optics Express, vol. 11, No. 5, Mar. 10, 2003, 9 pages.
Palima, D. et al., "Wave-guided optical waveguides", Optics Express, vol. 20, No. 3, Jan. 30, 2012, 11 pages.
Kress, B. et al. "A review of head-mounted displays (HMD) technologies and applications for consumer electronics", Photonic Applications for Aerospace, Commercial, and Harsh Environments IV, Proc. SPIE vol. 8720, May 31, 2013, 13 pages.
Chuan, S. et al., "Holographic projection using converging spherical wave illumination", In Proceedings of the 2013 Seventh International Conference on Image and Graphics, Jul. 26, 2013, Qingdao, China, 5 pages.
Bleha, W. et al., "Binocular Holographic Waveguide Visor Display", SID Symposium Digest of Technical Papers, vol. 45, No. 1, Jun. 1, 2014, 4 pages.
Yeom, H. et al., "3D holographic head mounted display using holographic optical elements with astigmatism aberration compensation", Optics Express 32025, vol. 23, No. 25, Dec. 3, 2015, 10 pages.
Goetz, et al., "Holographic display system for restoration of sight to the blind", In Journal of Neural Engineering, vol. 10, Issue 5, Oct. 2013, pp. 1-23.
Kessler, Dave, "Optics of Near to Eye Displays (NEDs)", In Proceedings of Oasis, Feb. 19, 2013, pp. 1-37.
"SBG Labs Holographic Eye Adaptive Display (HEAD) Technology", https://www.youtube.com/watch?v=XkmgKeGn4yo, Published on: Mar. 11, 2012, 1 pages.
Lanman, et al., "Near-Eye Light Field Displays", In proceedings of International Conference on Computer Graphics and Interactive Techniques, Jul. 21, 2013, 10 pages.
Qu, et al., "Image magnification in lensless holographic projection using double-sampling Fresnel diffraction", In Journal of Applied Optics, vol. 54, Issue 34, Nov. 24, 2015.
Kollin, el al., "Holographic Near Eye Display". U.S. Appl. No. 14/754,451, filed Jun. 29, 2015.
Luminit, "Lunar EVA Holographic Display(LEVAD)". Research & Development for NASA. Retrieved on Dec. 13, 2016. Available at: http://www.luminitrd.com/NASA.html.
Robbins, et al., "Holographic Wide Field of View Display" U.S. Appl. No. 15/268,269, filed Sep. 16, 2016.
Li et al., "Holographic display for see-through augmented reality using mirror-lens holographic optical element"; Opitcal Society of America; vol. 41, No. 11, Jun. 1, 2016, 4 pages.
Lee et al., "See-Through Light Field Displays for Augmented Reality", SIGGRAPH Asia 2016 Virtual Reality meets Physical Reality: Modeling and Simulating Virtual Humans and Environments; Article No. 3, Dec. 5, 2016, 2 pages.
Kaczoroski et al., "Adaptive, spatially-varying aberration correction for real-time holographic projectors," Optics Express 24, vol. 24, No. 14, 15742-15756; Jul. 5, 2016, 15 pages.
Composyt Light Labs. Retreived on Jan. 3, 2017. 1 page Available at: https://web.archive.org/web/20140712142944/http://composyt.com/.
Burt, Jeffrey, "Intel Buys Smart Eyewear Maker Composyt". eWeek. Jan. 21, 2015. 4 pages Available at: http://www.eweek.com/blogs/first-read/intel-buys-smart-eyewear-maker-composyt.html.
Laing, Roger, "Glass, what Glass? Intel snaps up Swiss eyewear startup" ZDNet. Jan. 21, 2015. 4 pages Available at: http://www.zdnet.com/article/glass-what-glass-intel-snaps-up-swiss-eyewear-startup/.
Oh et al., "Achromatic diffraction from polarization gratings with high efficiency", Optical Society of America, vol. 33, No. 20, Oct. 15, 2008, 3 pages Retrieved at: http://www.imagineoptix.com/wp-content/themes/imagineoptix/pdfs/OL_OH_APG.pdf.

(56) References Cited

OTHER PUBLICATIONS

Khorasaninejad et al., "Metalenses at visible wavelengths: Diffraction-limited focusing and subwavelength resolution imaging," www.Sciencemag.org, vol. 352, No. 6290, 2016, 6 pages.
"Non Final Office Action Issued in U.S. Appl. No. 15/397,646", dated Oct. 16, 2018, 10 Pages.
"Final Office Action Issued in U.S. Appl. No. 15/397,646", dated Feb. 7, 2019, 11 Pages.
"Non Final Office Action Issued in U.S. Appl. No. 15/397,646", dated May 14, 2019, 11 Pages.
"Final Office Action Issued in U.S. Appl. No. 15/397,646", dated Oct. 1, 2019, 14 Pages.
"Non-Final Office Action Issued in U.S. Appl. No. 15/397,646", dated Jan. 9, 2020, 14 Pages.
"Final Office Action Issued in U.S. Appl. No. 15/397,646", dated Apr. 30, 2020, 14 Pages.

* cited by examiner

REDUCED BANDWIDTH HOLOGRAPHIC NEAR-EYE DISPLAY

CROSS REFERENCE TO RELATED APPLICATIONS

This application is a continuation of U.S. patent application Ser. No. 15/397,646, filed on Jan. 3, 2017, and titled "REDUCED BANDWIDTH HOLOGRAPHIC NEAR-EYE DISPLAY", the entire disclosure of which is hereby incorporated herein by reference.

BACKGROUND

A near-eye display (NED) device may be implemented as a head-mounted display system that allows users to view images generated by holograms as an immersive experience. Images may appear to be on a single plane in the field-of-view (FOV) of the user, on multiple planes or form a truly three-dimensional object. Images displayed or projected to the user's eye by a NED device may be produced in various manners. For example, some NED devices may utilize (a) a plurality of display panels positioned within a user's FOV, (b) waveguides to deliver to a user's eyes imagery produced elsewhere in the system (c) or a partially reflective, partially transmissive element that relays the image into the user's eye.

SUMMARY

Examples are disclosed that relate to holographic NED systems. One example provides a NED device comprising a diverging light source (DLS) and a dynamic digital hologram (DDH) panel. The DDH panel is configured to receive light from the DLS and form an image. The NED device also includes a combiner comprising a holographic optical element (HOE) positioned to receive light from the DDH panel and to redirect the light toward an eyebox, the HOE being positioned between the eyebox and a view of an external environment to combine a view of the image formed by the DDH panel and the view of the external environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
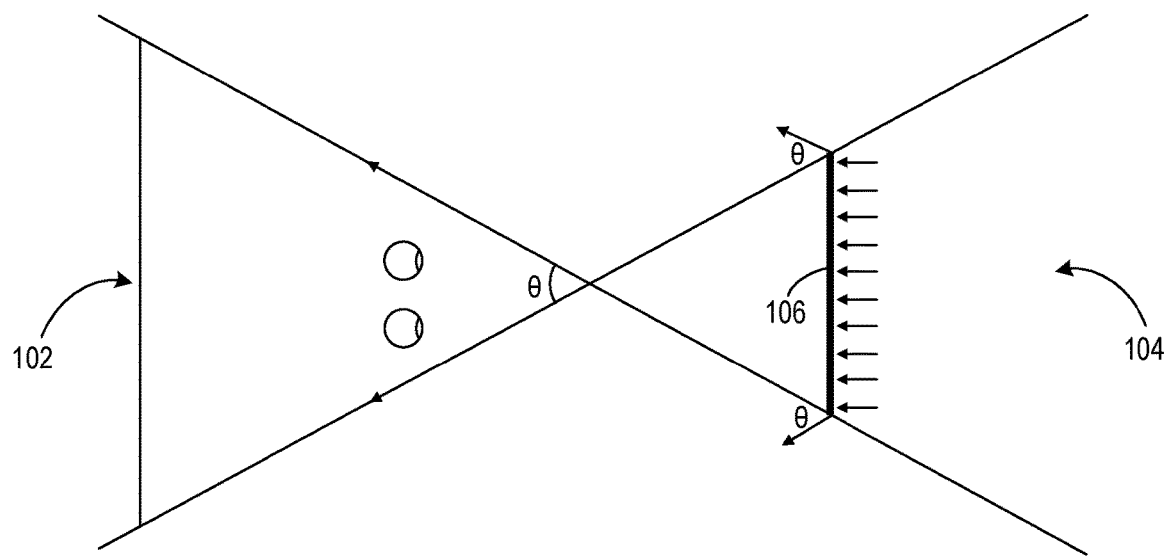
FIG. 1 schematically shows an example holographic display.

A DDH may be utilized in a display device, such as a near-eye display, to reproduce a light field. The term DDH as used herein signifies an optical element which modulates the phase of a wavefront instead of, or in addition to, an amplitude (intensity). Note that a DDH can be either transmissive or reflective and is the element that forms the image. A DDH is often referred to as a Spatial Light Modulator (SLM). The DDH may diffract light over a viewing zone determined by the pixel pitch of the DDH. For example, FIG. 1 schematically shows an example permissible viewing zone 102 and three-dimensional image zone 104 (which extends to infinity) from a holographic display utilizing a DDH 106. The resulting FOV is inversely proportional to the pixel pitch of the device. Therefore, the density of pixels on the DDH is proportional to the maximum FOV of the image, represented here by angle θ. When a large FOV is desirable, the overall resolution of the DDH may be relatively high. The required bandwidth of the DDH, here defined as the number of pixels displayed per second, may be very high, requiring the hardware for the DDH to be very complex, with impractical computation requirements and very high data transfer rates when used as a real-time display.

As one potential solution to such issues, a NED device may utilize an HOE that receives collimated light from a light source and outputs converging light toward a DDH before the light focuses at the pupil of a viewer's eye. The DDH may modulate the phase of the wavefront of the light, such that the light is diffracted to produce a set of rays corresponding to different points in the image. Because most of the diffractive power is in the HOE, this configuration allows the pixel pitch of the DDH to be considerably larger for the same FOV compared to when an HOE is not used. By increasing the pixel pitch, the DDH resolution reduces and the content of the Computer Generated Hologram (CGH) displayed on the DDH is considerably reduced. Thus, such a system may provide a relatively compact, high-resolution NED which may produce a light field and allow arbitrary focus and aberration correction, including aberrations of the viewer's eye.

However, in such an arrangement, the CGH on the DDH is directly viewed. As such, the FOV of the reconstructed image is limited by the size of the DDH. As DDHs are often implemented on silicon backplanes, they may cost significantly more with increasing size. Therefore, a device with a large FOV may be prohibitively expensive to produce. The use of multiple DDHs may help to address this issue as long as the gaps between the DDHs are smaller than the eye pupil, but also may increase costs. Additionally, such a system may use a liquid crystal on silicon (LCOS) panel as a spatial light modulator, which is opaque and thus prevents augmented reality (AR) or mixed-reality (MR) display without the use of a video feedthrough. Further, even a transparent DDH would diffract and scatter light coming from the outside world, thereby limiting its use as an AR or MR display system.

As alternatives, additional optical elements may be used to relay the holographic image to the eye, for example, via a beamsplitting component and a waveguide. However, such optical systems may be limited to producing images at optical infinity, may lead to more constraints on FOV, and may further reduce image quality while driving up cost.

Accordingly, examples are disclosed herein that relate to a holographic NED comprising a DLS and a DDH, which together serve as a holographic projector (HP) to produce an image via one or more encoded holograms. The NED further includes a HOE configured to relay the image from the HP to a viewer's eye/pupil. This may allow the reduction of the DDH resolution (and thus bandwidth) as achieved by the previous system described above, while additionally providing a transparent image path to allow the holographically projected image to be displayed as superimposed over a view of the real world for AR uses. Further, in the disclosed examples, the physical size of the DDH does not limit the size of the viewing window, permitting a FOV of the real world that is greater than the angular extent of the DDH and the FOV of the virtual world. This reduces the system cost and allows more options in the configuration of the overall system. The FOV of the disclosed examples are instead determined by the size of the HOE, which may be less costly than a DDH. Further, the use of an HOE may allow the display device to be more compact, since it allows the illumination of the display optics in front of the eye at a steep angle, thus reducing an amount of space required between the eye and the display. The disclosed examples also allow for aberration correction, and may utilize hologram computation methods that may allow more fine-grained control of the wave front. Additionally, a dynamic element may be added to the HOE in some examples. Such a dynamic element may be used to steer the light into the user's pupil and/or dim part of the real world.

HOEs are currently used in combination with scanned beam projectors or conventional image panels, rather than a holographic image-producing panel. Such systems utilizing a conventional scanned beam projector or conventional image panel and a HOE are limited by optical aberrations, in that a wide FOV may be provided, but not without significant aberrations that are difficult to correct. Further, although HPs have been used to correct for aberrations in certain optical configurations, these configurations may utilize optical combiners such as mirrors rather than HOEs. Thus, many existing technologies either include a conventional projector (i.e. a non-HP) and an HOE, or a HP without an HOE.

In contrast, the examples disclosed herein utilize the combination of a HP and an HOE, while addressing issues that may arise with this combination. As described in more detail below, the examples disclosed herein may allow a wide FOV while providing for aberration correction using encoded holograms, and further may provide better see-through capability and allow smaller form factors than other see-through display device configurations.

Figure 2:
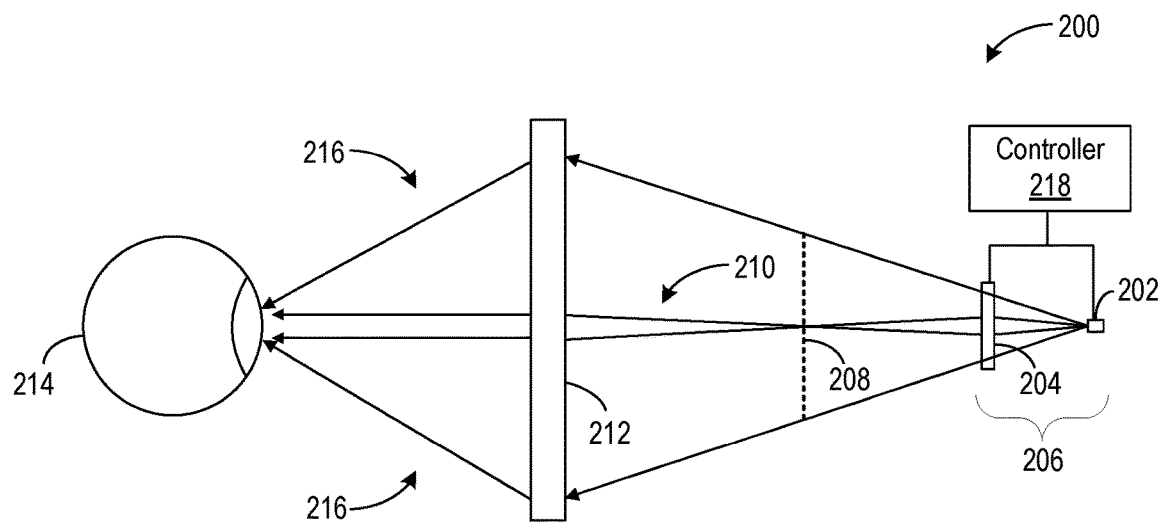
FIG. 2 schematically shows an example holographic display system comprising a relay element.

FIG. 2 schematically shows an example optical system 200. FIG. 2 provides a schematic representation of an optical path, and is not intended to imply any particular geometric arrangements of optical components in such an optical system. In optical system 200, DLS 202 and DDH 204 together form a HP 206 configured to form a projected intermediate holographic image 208. The HP unit 206 may include any additional suitable refractive, reflective, diffractive, and/or amplitude-modulating components. The projector 206 may reduce zero or higher holographic orders of light, and may shape, correct aberrations of, and/or re-direct the light exiting the projector unit. The DLS 202 may comprise, for example, one or more laser diodes, a fiber optic light source, and/or any other suitable DLS. In some examples, additional optical components may be optionally included to further increase divergence of the light beam.

Any suitable phase and/or amplitude modulating devices may be used as the DDH 204, such as a phase or amplitude LCD or LCOS. Color images may be formed using time sequential, spatially multiplexed, or interleaved (Bayer-like) methods.

The beam 210 output from the HP 206 expands as it travels until it encounters the HOE 212. The HOE 212 redirects the beam to converge at the position of the viewer's eye 214. In some examples, the HOE 212 may provide additional magnification (causing the beam to be converge more rapidly that it was expanding from the projector), may be placed off-axis, and/or may be transparent, allowing an undistorted see-through view to the user for AR image display. Further, in some examples, the HOE 212 may duplicate the incoming projected beam to form replicated exit pupils. For example, a fan-out diffractive optical element (DOE) may be used, with the HP 206 at one conjugate, and form an array of spots at the other conjugate each corresponding to a different pupil position. The arrows shown at 216 represent the overall FOV of the depicted system.

In other examples, the HOE 212 may have a switchable state, such as those provided by a switchable hologram, to allow the location of the exit pupil(s) to be switched between predetermined positions based on a tracked eye position as detected via an eye tracking device. In further examples, the HOE 212 may be configured to change the position of the exit pupil(s) based upon the optical characteristics of the incoming beam, such as wavelength or incoming angle. For example, a controller 218 may be used to control the HP 206 to change its beam wavelength or incoming angle, thereby causing the HOE 212 to redirect the light differently. In such an example, the HOE 212 may utilize a wavelength or angularly selective Bragg hologram.

Figure 3:
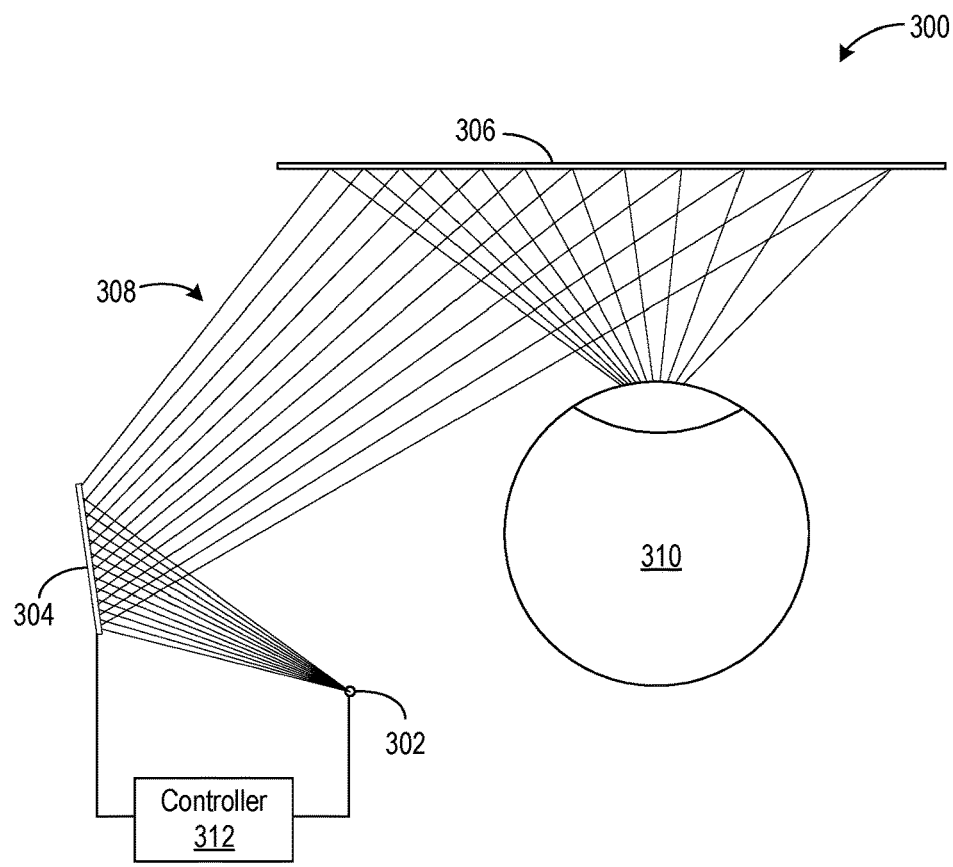
FIG. 3 schematically shows another example holographic display system comprising a relay element.

FIG. 3 shows another example optical system 300. In this example, DLS 302 and reflective DDH 304 are arranged off-axis, and illumination of the HOE 306 occurs at a relatively steep angle. Such a configuration may provide a more compact form factor of the NED. In this example, the HOE 306 acts as an off-axis point-to-point reflective HOE to transmit imaged light 308 to the eye 310. A controller 312 may control the DLS 302 and reflective DDH 304 for illumination of the HOE 306. It will be understood that the optical system 300 may have any additional suitable refractive, reflective, diffractive, and/or amplitude-modulating components.

Aberration correction may be challenging in a system utilizing a HP and a HOE as a combiner for AR display. Thus, in the example of FIG. 3, aberrations may be corrected by computing a CGH for the DDH to pre-distort the wavefront to compensate for any aberrations from the HOE. Further, the DDH also may be configured to control focal depth of the projected image on a pixel-by-pixel basis. Positioning and orientation of the DDH may be selected to provide a suitably even distribution of resolution over the FOV of the NED. For example, the DDH may be tilted such that the optical axes of the DDH and the HOE are aligned.

As mentioned above, in some examples, multiple exit pupils may be produced. In such examples, the aberrations may be optionally corrected only for an active pupil, e.g. the exit pupil nearest the viewer's eye based on eye tracking data. Where multiple exit pupils are used, the multiple exit pupils may be spaced apart sufficiently, and/or may be appropriately shifted such that only one is positioned to enter the viewer's eye.

In some examples, the position of the exit pupil(s) may be shifted according to a tracked eye position, e.g. by switching between different light sources incident on the holographic image-producing panel, by mechanically moving a light source to change a location and/or angle at which it is incident on the DDH, and/or by electrically switching between multiple holograms encoded in the HOE. Further, the exit pupil(s) also may be shifted by the HOE based on a property of incoming light. For example, light may be steered to a different exit pupil position based upon a wavelength, polarization, incident angle or other suitable property of the incoming light.

In some examples, varying aberration correction functions may be applied over portions of the image, while in other examples a same single aberration correction function may be applied over an entire image. Additionally, in some examples, correction of aberrations and/or focus may be performed in a sub-portion of the image, such as a sub-portion in which the viewer is looking or near a location of a tracked fovea position based on eye tracking data, while aberrations and/or focus are left uncorrected, or only partially corrected, in other portions of the image. The DDH 304 also may be used to correct for aberrations in the viewer's eye, such as astigmatism or higher order aberrations that may be difficult to correct with ordinary eyeglasses. In some examples, where a color NED is utilized, aberrations may be corrected individually for each color channel in the NED device.

Any suitable techniques may be used to calculate the CGH to be displayed on the DDH. As one example, each point in a perceived image may be traced backwards through the HOE to the DDH in the HP unit, and also traced forward from the DLS to the DDH. Based upon these tracings, a suitable phase delay function may be calculated as the total path length and integrated into the DDH. The process may be repeated for each point of the image to generate an arbitrary image with per-pixel depth and with arbitrary aberrations, with consideration of a bandwidth of the DDH. The phase function for generating each image point may be generated by characterizing the aberrations, which are integrated to form the final hologram. As an example, the aberrations may be characterized in terms of Zernike polynomials.

Further, in some examples, a CGH may be calculated as an integration of multiple sub-CGHs, where each sub-CGH may produce a wavefront that appears as a sub-region of the image. A phase of each sub-CGH may be selected such that the phase has a suitable level of consistency over the image between adjacent sub-CGHs (e.g. within a threshold consistency). In such examples, each sub-CGH may be computed to produce a wavefront based on a selected optical aberration model. The optical aberration model may include model parameters selected by observing the wavefront through the NED, e.g. via a camera, and adjusting the model parameters to reduce a spot size.

In some examples, to achieve faster computation of the CGH, aberrations may be corrected using a single aberration correction function and a single focal depth applied to the whole image. Such a method may result in less accurate aberration correction than the use of a greater number of correction functions and different focal depths at different pixels, but may be sufficient if the correction is accurate for the portion of the image that the viewer is looking at based upon eye tracking data. Such a method can be computed by convolving the image with a suitable aberration correction phase function. Fast convolution may be performed using fast Fourier transform-based convolution, or separable (e.g. linearly separable) direct convolution. As a more specific example, a CGH may be calculated, among other steps, as an inverse fast Fourier transform (FFT) of the product of FFT of the image multiplied with the FFT of a phase function that corrects for aberrations and focuses light at a depth in the portion of the image that is near the tracked position of the fovea. CGH calculation may further be simplified by using a larger area of the DDH to calculate portions of the image near the tracked position of the fovea, while using a smaller area of the DDH in other portions of the image.

Phase-only CGH may be optimized and/or calculated via a Gerchberg-Saxton-like algorithm using corresponding forward and reverse transforms and its variants like the Fienup algorithm. Phase-only holograms may also be computed using non-iterative direct encoding methods, such as double phase and error diffusion methods. To further improve CGH calculation speed, the CGH may be computed such that the image is calculated based on the fall-off of human visual acuity with angle. This may be accomplished by reducing the effective window or aperture size of the CGH (e.g. the region of the CGH that affects a single image point) to be suitably small, while achieving the target resolution over the FOV. For a sparse AR display, e.g. where virtual objects do not fill up the majority of the FOV, computation time may be further reduced by reducing the computation effort or not computing regions of the CGH that correspond to empty, non-virtual regions in the image.

In addition to the combiner being comprised of one or more HOEs, it will be understood that other diffractive, refractive or reflective elements may be employed as a combiner, including engineered metamaterials. Metamaterial layers can be used in a similar manner to HOEs, and may avoid chromatic aberrations that may be found in optically generated holographic optics.

Yet other examples of optics that may be used as a combiner may include digitally generated (computed) diffractive optics, and optical copies of digitally generated optics. The latter may include Bragg reflective-type holograms, which preferentially reflect different wavelengths of light corresponding to the Red, Green, and Blue wavelengths of the dynamic CGH, with a separate holographic fringe structure for each of the three (or more) wavelengths corresponding to the desired conjugate point for its wavelength, and may be substantially transparent for other wavelengths. It will be understood that the different Bragg structures corresponding to each wavelength may be in physically separate but adjacent layers recorded in a material such as photopolymer, or in a single layer in which the different Bragg structures are multiplexed via recording with multiple lasers or multiple exposures. Another example may include polarization holographic elements which employ a chiral dopant to obtain properties similar to Bragg holograms but with a polarization dependent property.

Figure 4:
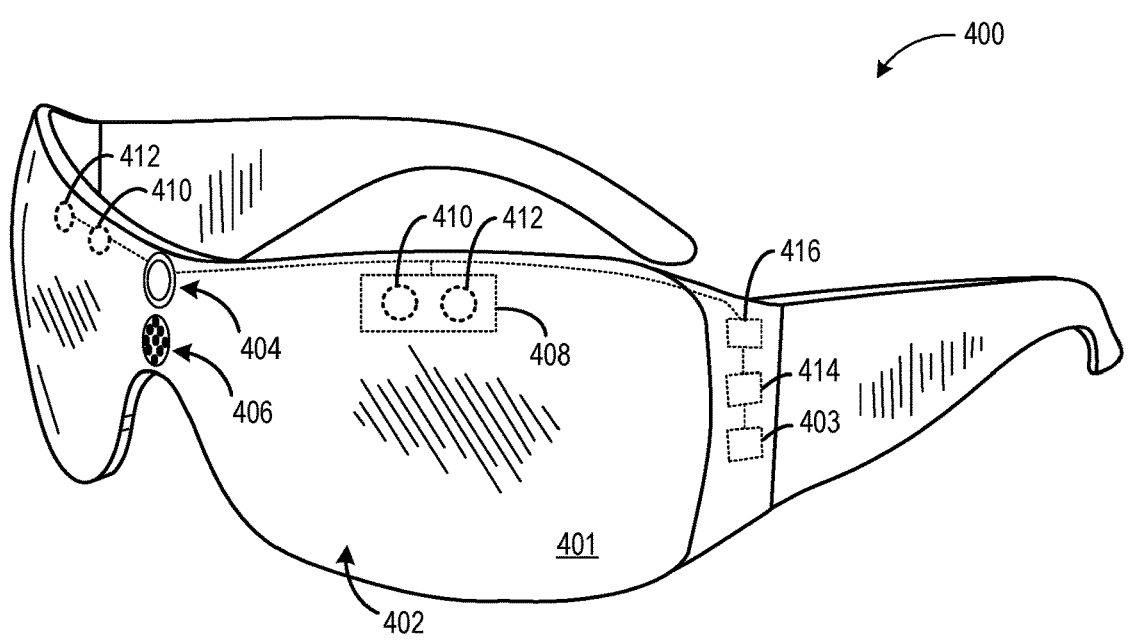
FIG. 4 shows an example head-mounted display system.

As described above, the examples disclosed herein may be incorporated into NED devices with relatively compact form factors, given the ability to utilize a relatively small DDH and compact combiner, and to illuminate the display optics off-axis at a steep angle. FIG. 4 shows an example head-mounted display device 400 having a relatively thin form factor, e.g. an eyeglass configuration. The head-mounted display device 400 includes one or more lenses 401 that form a part of a see-through display 402, such that images may be displayed via lenses 401, e.g. via projection onto lenses 401. The see-through display 402 may take any suitable form, such as that of a combiner comprising an HOE configured to receive a generated image from a HP unit 403 and direct the image towards a wearer's eye. The head-mounted display device 400 further includes one or more outward-facing image sensors 404 configured to acquire images of a background scene and/or physical space being viewed by a user, and may include one or more microphones 406 configured to detect sounds, such as voice commands from a user. The outward-facing image sensors 406 may include one or more depth sensors and/or one or more two-dimensional image sensors.

The head-mounted display device 400 may further comprise an eye tracking subsystem 408 configured to detect an eye gaze direction/fovea position of each eye of a user for use in hologram computation, as mentioned above. The eye tracking subsystem 408 may be configured to determine gaze directions of each of a user's eyes. For example, in the depicted embodiment, the eye tracking subsystem 408 includes one or more glint sources 410, such as infrared light sources, configured to cause a glint of light to reflect from each eyeball of a user, and one or more image sensors 412, such as inward-facing sensors, configured to capture an image of each eyeball of the user. Changes in the glints from the user's eyeballs and/or a location of a user's pupil as determined from image data gathered via the image sensor(s) 412 may be used to determine an eye gaze direction/fovea position. The eye tracking subsystem 408 may have any suitable number, type, and arrangement of light sources and image sensors.

The head-mounted display device 400 may further include one or more motion sensors 414 to detect movements of a user's head when the user is wearing the head-mounted display device 400. Motion data may be used, along with optional eye tracking data and/or outward-facing image data, for eye tracking and gaze detection, as well as for image stabilization to help correct for blur in images from the outward-facing image sensor(s) 406. The use of motion data may allow changes in gaze location to be tracked even if image data from outward-facing image sensor(s) 406 cannot be resolved. Likewise, motion sensors 414, as well as microphone(s) 406 and eye tracking subsystem 408 also may be employed as user input devices, such that a user may interact with the head-mounted display device 400 via gestures of the eye, neck and/or head, as well as via verbal commands. It will be understood that the sensors illustrated in FIG. 4 are shown for the purpose of example and are not intended to be limiting in any manner, as any other suitable sensors and/or combination of sensors may be utilized.

The head-mounted display device 400 further includes a controller 416 having a logic subsystem and a storage subsystem in communication with the various sensors, the holographic projector 403, and the eye tracking subsystem 408. The controller 416 is an example of the controller 218 or the controller 312 described above. The controller 416 may be configured, for example, to receive and analyze inputs from the sensors, to identify movements of a user, to track eye fovea positions and gaze directions, to generate images, and to compute holograms to pre-distort the wavefront for aberration correction, among other tasks.

The depicted head-mounted display device 400 is shown for the purpose of example, and is not meant to be limiting. The head-mounted display device 400 may include additional and/or alternative sensors, cameras, microphones, input devices, output devices, etc. than those shown without departing from the scope of this disclosure. As examples, other components may include speakers, accelerometers, gyroscopes, magnetometers, temperature sensors, touch sensors, biometric sensors, other image sensors, energy-storage components (e.g. battery), a communication facility, a Global Positioning System receiver, etc. Further, the physical configuration of a display device and its various sensors and subcomponents may take a variety of different forms without departing from the scope of this disclosure.

In some examples, the head-mounted display device 400 may include a low resolution peripheral display to increase the FOV. As another example, the holographic projector may form the image in a tracked foveal region while an alternate display provides a lower fidelity background image to other regions. A near-eye display device may also include a global or regional dimming or occluding device that allows a transparency of the device to be varied. A light engine for the holographic projector, such as an array of RGB lasers, may be incorporated into a remote unit that may reside in a separate location than the head-mounted display device, such as in a pocket, worn on another part of the body, etc., and connected to the glasses with a fiber optic cable.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
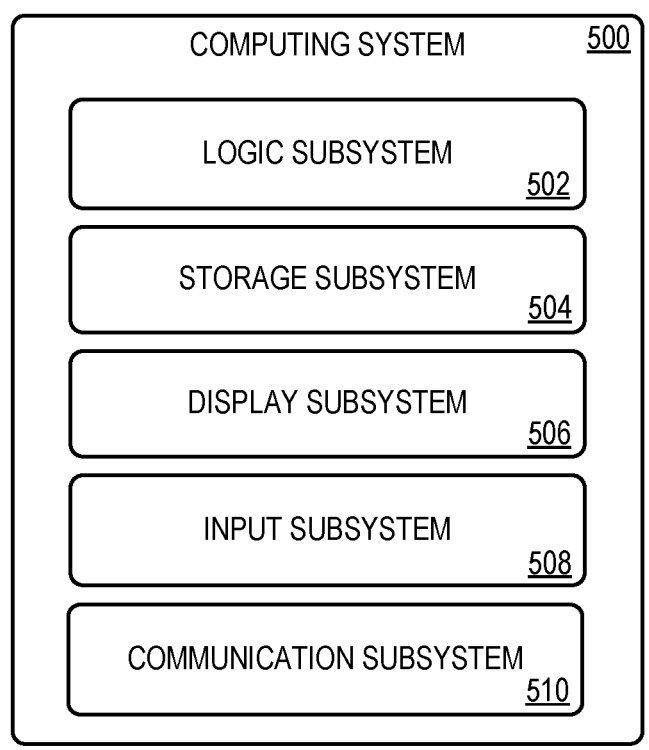
FIG. 5 shows a block diagram of an example computing system.

FIG. 5 schematically shows a non-limiting embodiment of a computing system 500 that can enact one or more of the methods and processes described above. For example, computing system 500 is representative of controller 218, 312, or 416. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem 502 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 502 may include one or more processors configured to execute software instructions. Additionally or alternatively, the logic subsystem 502 may include one or more hardware or firmware logic machines configured to execute hardware or firmware instructions. Processors of the logic subsystem 502 may be single-core or multi-core, and the instructions executed thereon may be configured for sequential, parallel, and/or distributed processing. Individual components of the logic subsystem 502 optionally may be distributed among two or more separate devices, which may be remotely located and/or configured for coordinated processing. Aspects of the logic subsystem 502 may be virtualized and executed by remotely accessible, networked computing devices configured in a cloud-computing configuration.

Storage subsystem 504 includes one or more physical devices configured to hold instructions executable by the logic subsystem 502 to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage subsystem 504. This visual representation may take the form of a graphical user interface (GUI). As the herein described methods and processes change the data held by the storage subsystem 504, and thus transform the state of the storage subsystem 504, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides near-eye display device comprising a DLS, an image-producing DDH panel configured to receive light from the diverging light source and form an image, and a combiner comprising a HOE positioned to receive light from the image-producing DDH panel and to redirect the light toward an eyebox, the HOE being positioned between the eyebox and a view of an external environment to combine a view of the image formed by the DDH panel and the view of the external environment. The near-eye display device may additionally or alternatively include a controller in communication with the DDH panel, the controller being configured to control the DDH panel to control a focal depth of each pixel in the image. The controller may be additionally or alternatively configured to control the DDH panel to correct for aberrations in one or more of the holographic optical element and a viewer's eye. The controller may be additionally or alternatively configured to control the DDH panel to correct for aberrations by calculating a CGH as an integration of sub-holograms. The controller may be additionally or alternatively configured to control the DDH panel to compute the sub-CGH by tracing a bundle of rays for each point in the image from an eye to the DDH panel, and from the DLS to the DDH panel, and to compute an associated phase delay. The controller may be additionally or alternatively configured to control the DDH panel to compute the sub-CGH to produce a wavefront based on an optical aberration model for the optical system. The near-eye display device may additionally or alternatively include a camera, wherein the controller is configured to select model parameters of the optical aberration model based on observing the wavefront via one or more of an eye and the camera, and adjust the model parameters to reduce a spot size. The controller may be additionally or alternatively configured to select the phase of each sub-CGH such that the phase is within a threshold consistency over the image between sub-CGHs. The controller may be additionally or alternatively configured to control the DDH panel to correct for aberrations individually for each color channel in the display device. The controller may be additionally or alternatively configured to control the DDH panel to correct for one or more of focus and aberrations in a portion of the image near a tracked position of a fovea and not in another portion of the image. The controller may be additionally or alternatively configured to control the DDH panel to compute a CGH as an inverse fast Fourier transform of a product of a fast Fourier transform of the image multiplied with a fast Fourier transform of a phase function that corrects for aberrations and focuses light at a depth in the portion of the image near the tracked position of the fovea. The DDH panel may be additionally or alternatively controllable to compute a CGH based on a separable convolution or a fast Fourier transform convolution, and wherein the phase modulating panel is further controllable to compute the hologram by using a larger area of the CGH to calculate portions of the image near the tracked position of the fovea, and a smaller area of the CGH in other portions of the image. The controller may be additionally or alternatively configured to shift an exit pupil by electrically switching between holograms in the holographic optical element. The controller may be additionally or alternatively configured to shift an exit pupil via an HOE sensitive to a property of incoming light and configured to steer light to a different exit pupil position based upon the property. The controller may be additionally or alternatively configured to control the DDH panel to correct for aberrations based on a position of an exit pupil. The DDH panel may be additionally or alternatively positioned and oriented to provide an even distribution of resolution over a field of view of the display device.

Another example provides for a near-eye display device, comprising a DLS, a DDH panel configured to receive light from the DLS, form an image from the light, and redirect the light, a combiner comprising a HOE positioned to receive light from the DDH panel and to redirect the light toward an eyebox, the HOE being positioned between the eyebox and a view of an external environment to combine a view of the image formed by the DDH panel and the view of the external environment, and a controller configured to control the DDH panel to produce the image and to pre-distort a wavefront produced by the DDH panel to compensate for aberrations of the HOE or other integrated optics. The controller may be additionally or alternatively configured to control the DDH panel to pre-distort the wavefront to compensate for aberrations in a sub-portion of the image based upon eye tracking data.

Another example provides a near-eye display device, comprising a DLS, a DDH panel configured to receive light from the DLS, form an image from the light, and redirect the light, a combiner comprising a HOE positioned to receive light from the DDH panel and to redirect the light toward an eyebox, the HOE being positioned between the eyebox and a view of an external environment to combine a view of the image formed by the DDH panel and the view of the external environment, and a controller configured to control the DDH panel to produce the image and to pre-distort a wavefront produced by the DDH panel to compensate for optical characteristics of a user's eye. The controller may be additionally or alternatively configured to control the DDH panel to pre-distort the wavefront to compensate for optical characteristics of the user's eye in a sub-portion of the image based upon eye tracking data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display device, comprising:
a diverging light source (DLS);
an image-producing Dynamic Digital Hologram (DDH) panel configured to receive diverging light from the DLS and form an image, the DDH panel being controllable to display a Computer Generated Hologram (CGH) and compute the CGH by using a larger area of the CGH to calculate portions of the image near a tracked position of a fovea, and a smaller area of the CGH in other portions of the image; and
a combiner that uses digitally generated diffractive optics positioned to receive light from the image-producing DDH panel and to redirect the light toward an eyebox, the combiner being positioned between the eyebox and a view of an external environment to combine a view of the image formed by the DDH panel and the view of the external environment, the digitally generated optics comprising Bragg holograms configured to reflect different wavelengths of light.

2. The near-eye display device of claim 1, wherein the digitally generated diffractive optics comprises an optical copy of a digitally generated diffractive optic.

3. The near-eye display device of claim 1, wherein the plurality of Bragg holograms are configured to preferentially reflect wavelengths of light corresponding to wavelengths of light diffracted by the CGH.

4. The near-eye display device of claim 3, wherein the plurality of Bragg holograms are located in physically separate layers.

5. The near-eye display device of claim 3, wherein the plurality of Bragg holograms are multiplexed within a single layer.

6. The near-eye display device of claim 1, further comprising a controller in communication with the DDH panel, wherein the controller is configured to control the DDH panel to control a focal depth of each pixel in the image.

7. The near-eye display device of claim 1, wherein the controller is configured to control the DDH panel to correct for aberrations by calculating a CGH as an integration of sub-CGHs.

8. The near-eye display device of claim 7, wherein the controller is configured to control the DDH panel to compute the sub-CGHs by tracing a bundle of rays for each point in the image from an eye to the DDH panel, and from the DLS to the DDH panel, and to compute an associated phase delay.

9. The near-eye display device of claim 7, wherein the controller is configured to control the DDH panel to compute the sub-CGHs to produce a wavefront based on an optical aberration model for the optical system.

10. The near-eye display device of claim 9, further comprising a camera, and wherein the controller is configured to select model parameters of the optical aberration model based on observing the wavefront via the camera, and adjust the model parameters to reduce a spot size.

11. The near-eye display device of claim 1, wherein the controller is configured to control the DDH panel to correct for aberrations in one or more of the digitally generated diffractive optics and a viewer's eye.

12. The near-eye display device of claim 1, wherein the controller is configured to control the DDH panel to correct for one or more of focus and aberrations in a portion of the image near the tracked position of the fovea and not in another portion of the image.

13. The near-eye display device of claim 1, wherein the DDH panel is controllable to compute the CGH based on a separable convolution or a fast Fourier transform convolution.

14. The near-eye display device of claim 1, wherein the controller is configured to shift an exit pupil via an optical element sensitive to a property of incoming light and configured to steer light to a different exit pupil position based upon the property.

15. The near-eye display device of claim 1, wherein the controller is configured to control the DDH panel to correct for aberrations based on a position of an exit pupil.

16. The near-eye display device of claim 1, wherein the Bragg holograms comprise physically separate layers.

17. The near-eye display device of claim 1, wherein the Bragg holograms comprise a single layer.

18. The near-eye display device of claim 1, wherein the controller is configured to control the DDH panel to correct for aberrations individually for each color channel in the near-eye display device.

19. A near-eye display device, comprising:
a diverging light source (DLS);
an image-producing Dynamic Digital Hologram (DDH) panel configured to receive diverging light from the DLS and form an image, the DDH panel being controllable to display a Computer Generated Hologram (CGH) computed based on a separable convolution or a fast Fourier transform convolution, the DDH panel further being controllable to compute the CGH by using a larger area of the CGH to calculate portions of the image near a tracked position of a fovea, and a smaller area of the CGH in other portions of the image; and a combiner that uses digitally generated diffractive optics positioned to receive light from the image-producing DDH panel and to redirect the light toward an eyebox, the combiner being positioned between the eyebox and a view of an external environment to combine a view of the image formed by the DDH panel and the view of the external environment, the digitally generated optics comprising Bragg holograms configured to reflect different wavelengths of light.

20. The near-eye display device of claim 19, wherein the DDH panel is controllable to correct for aberrations individually for each color channel in the near-eye display device.

* * * * *